United States Patent
Daniel et al.

(10) Patent No.: US 9,391,945 B1
(45) Date of Patent: Jul. 12, 2016

(54) SYSTEM AND METHOD OF POSTING CODED MESSAGES ON SOCIAL NETWORKS

(71) Applicant: Isaac S. Daniel, Miramar, FL (US)

(72) Inventors: Isaac S. Daniel, Miramar, FL (US); Damion Daniel Codrington, Miramar, FL (US)

(*) Notice: Subject to any disclaimer, the term of this patent is extended or adjusted under 35 U.S.C. 154(b) by 224 days.

(21) Appl. No.: 13/935,740

(22) Filed: Jul. 5, 2013

Related U.S. Application Data

(63) Continuation-in-part of application No. 13/532,615, filed on Jun. 25, 2012, and a continuation-in-part of application No. 13/682,676, filed on Nov. 20, 2012, now Pat. No. 9,204,265, and a continuation-in-part of application No. 13/562,161, filed on Jul. 30, 2012, now Pat. No. 8,874,089.

(60) Provisional application No. 61/668,380, filed on Jul. 5, 2012.

(51) Int. Cl.
*G06F 15/16* (2006.01)
*H04L 12/58* (2006.01)

(52) U.S. Cl.
CPC .................................. *H04L 51/32* (2013.01)

(58) Field of Classification Search
CPC ....... H04L 51/32; H04L 67/306; H04L 51/10; H04L 12/588; G06Q 50/01
See application file for complete search history.

(56) References Cited

U.S. PATENT DOCUMENTS

| | | | |
|---|---|---|---|
| 6,629,793 B1 | 10/2003 | Miller | |
| 2007/0123233 A1 | 5/2007 | Houmura et al. | |
| 2010/0005065 A1* | 1/2010 | Lai | 707/3 |
| 2010/0125785 A1 | 5/2010 | Moore et al. | |
| 2010/0179991 A1 | 7/2010 | Lorch et al. | |
| 2010/0251177 A1* | 9/2010 | Geppert et al. | 715/821 |
| 2011/0276398 A1* | 11/2011 | Peng | 705/14.53 |
| 2012/0197980 A1* | 8/2012 | Terleski et al. | 709/203 |
| 2012/0197996 A1* | 8/2012 | Raman et al. | 709/204 |
| 2012/0284649 A1* | 11/2012 | Levy | 715/753 |
| 2013/0091206 A1* | 4/2013 | Moraes et al. | 709/204 |
| 2013/0346205 A1* | 12/2013 | Hogg et al. | 705/14.58 |

* cited by examiner

*Primary Examiner* — Benjamin M Thieu
(74) *Attorney, Agent, or Firm* — Carol N. Green Kaul, Esq.

(57) ABSTRACT

The present invention relates generally to a system and method of posting coded messages using a software application program comprising computer executable instruction code configured for displaying a transformed display, which mimics the social network but also includes the most recent message posts from a user's social network wall and including at least one radial button for selecting at least one coded icon corresponding to at least one decoded message; receiving a selection of the at least one coded icon corresponding to the at least one decoded message; converting the selected at least one coded icon into the corresponding decoded message and posting in realtime the decoded message or icons on the user's wall within the application program or a link reference in one or more authorized social networks.

22 Claims, 14 Drawing Sheets

SYSTEM AND METHOD OF POSTING CODED MESSAGES ON SOCIAL NETWORKS

PRIORITY CLAIM

This patent application is a continuation in part of, and claims priority to U.S. Non-Provisional application Ser. No. 13/532,615 titled "Apparatus System And Method For Transmitting Decoded messages Electronically" filed on Jun. 25, 2012; U.S. Non-Provisional application Ser. No. 13/682,676 titled "Method of Transmitting Decoded messages And Providing for Calendaring Responses" filed Nov. 20, 2012; U.S. Non-Provisional application Ser. No. 13/562,161 titled "System & Method Of Posting A Video Map Location On A Social Network" filed Jul. 30, 2012; and U.S. Provisional Application Ser. No. 61/668,380 titled "System & Method of Transmitting Decoded messages on Social Networks" filed Jul. 5, 2012. The entire disclosures of the afore-mentioned applications are incorporated by reference as if fully stated herein.

FIELD OF THE INVENTION

The present invention relates generally to a system and method of posting coded messages using a software application program comprising computer executable instruction code configured for displaying a transformed display, which mimics the social network but also includes the most recent message posts from a user's social network wall and including at least one radial button for selecting at least one coded icon corresponding to at least one decoded message; receiving a selection of the at least one coded icon corresponding to the at least one decoded message; converting the selected at least one coded icon into the corresponding decoded message and posting in realtime the decoded message or icons on the user's wall within the application program or a link reference in one or more authorized social networks.

DESCRIPTION OF THE PRIOR ART

In the era of posting one's location on a social network the demand is present for consistent updates for a social networker's current location. However, due to other obligations a social networker may not always be available to post the same, e.g. currently at work or at a location that does not lend itself to a long, in-depth description of his/her whereabouts. Moreover, certain social networks have character limitations, which may be insufficient to convey the full import of a message to an intended audience. Thus, it would be useful if the user had the ability to send a message, or iconic characters which will enable the user(s) to type words beyond the usual character limitations for any given social network.

Additionally, since it is known that the information posted on social networks remain public, there may be a need to convey a message to individual persons or corporate entities that would have significance to the intended readers but not to other incidental readers who may have access to the message or posting, by virtue of open privacy settings on the particular social network. Thus, it would be helpful if individuals could communicate more privately on social networks, using for instance their own codes or language to communicate thoughts and ideas without the message or postings being fully understood by unintended readers.

This invention satisfies these long felt needs in a new and novel manner and solves the foregoing problems that the prior art has been unable to resolve.

SUMMARY

A primary object of the present invention is to provide a system and method of posting coded messages on a social network using a mobile communication device that overcomes the limitations of the prior art.

Another object of the present invention is to provide a system and method for posting short coded messages via mobile communication devices using pre-programmed and/or programmable buttons from a virtual keyboard or a list of icons.

Yet another object of the invention is to provide the means for users to customize a decoded message for a particular icon.

Yet another object of the invention is to provide a system and method for correlating short messages with display icons which may be used to post at least one decoded message on the user's wall of the software application or a link reference to at least one or a plurality of social networks.

Still yet another object of the invention is to allow users to customize the short messages to communicate in a language of their own choice.

For a further and more fully detailed understanding of the present invention, various objects and advantages thereof, reference is made to the following detailed description and the accompanying drawings.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1A:
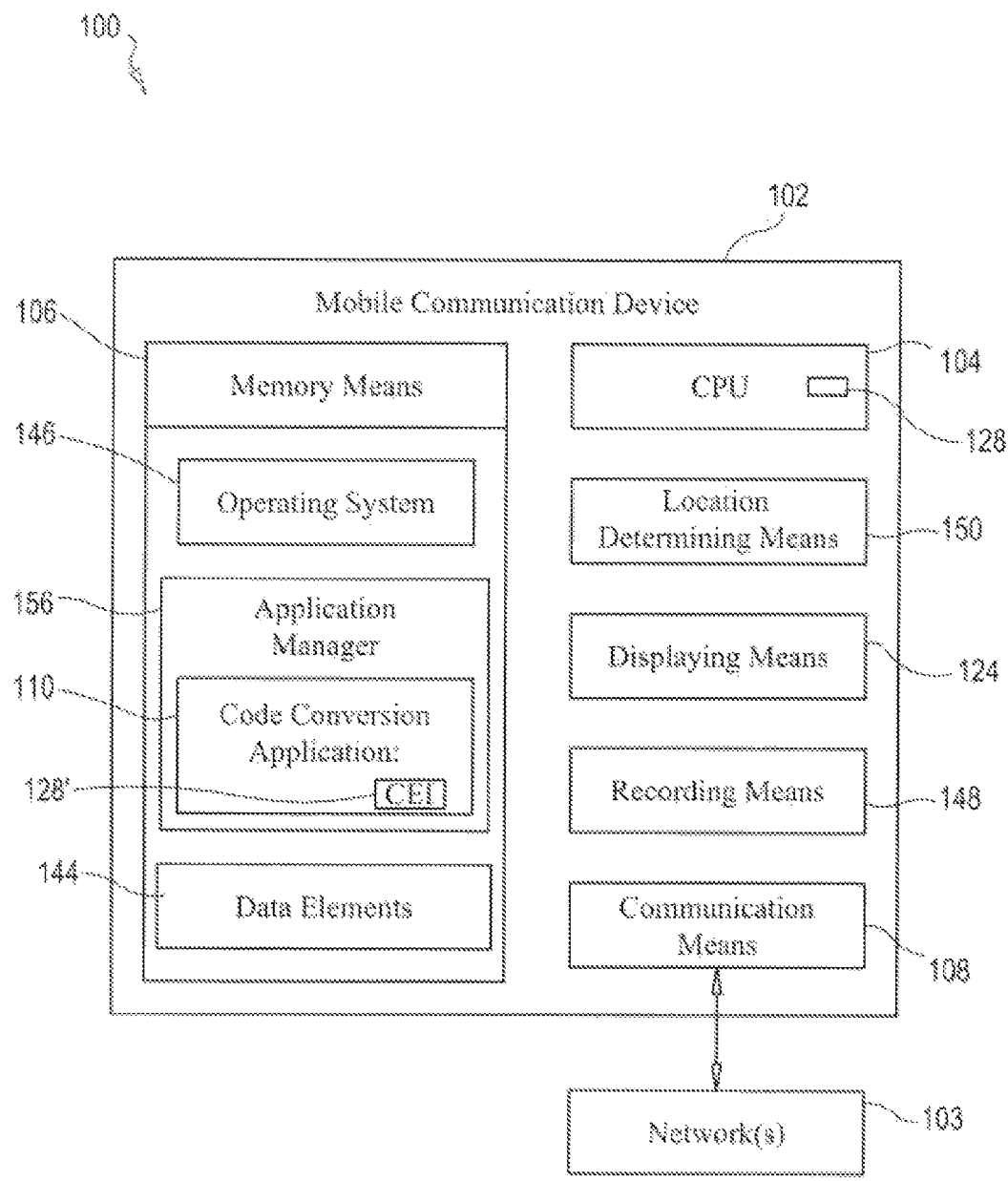
FIG. 1A-1B are exemplary embodiments of the system according to one embodiment.

The following discussion describes in detail an embodiment of the various methods for transmitting decoded messages as described below. However, this discussion should not be construed, as limiting the invention to those particular embodiments, as practitioners skilled in the art will appreciate that an apparatus, system and method may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. For a definition of the complete scope of the invention, the reader is directed to the appended claims. Turning now descriptively to the drawings, in which similar reference characters denote similar elements throughout the several views.

FIG. 1A is an illustrative view of the system 100 according to one embodiment of the present invention. System 100 includes an exemplary mobile communication device 102, which includes any type of a network enabled computer device configured with means for communicating wirelessly and/or wired with other mobile communication devices 102, 102', such as but not limited to, cellular phones (e.g., an iPhone, Android, Palm, Blackberry, or any "smart phone" as are generally known and used in the arts), location-aware portable phones (such as GPS), a personal computer, server computer, or laptop, or netbook computer, a personal digital assistant ("PDA") such as a Palm-based device or Windows CE device, a laptop computer, a tablet, personal computer, a portable screen, a portable processing device and/or any other portable device capable of communicating wirelessly over a computer network 103, i.e. local area network, wide area network such as the Internet, or any other type of network device that may communicate over a network 103.

Mobile communication device 102 may include various hardware components, e.g. a computer processor 104, memory means 106, and one or more communication means 108. Computer processor 104 may be any type of processor, such as, but not limited to, a central processing unit (CPU), a microprocessor, a video processor, a front end processor, a coprocessor, a single-core processor, a multi-core processor, as well as any known computer processor 104 that's used in the arts. Computer processor 104 may be programmed to activate a code conversion application ("app") program 110 for managing social network feeds wherein a user may sign in to one or more social networks 112, 112', select at least one or more coded icons 114, 114' from either a virtual keyboard 116 or a list 118 of a plurality of icons 114, 114', for posting a link 120 reference to at least one or more social networks 112, 112' for the corresponding decoded message 122, or edit the decoded message 122 corresponding to the icon 114 that may be displayed on the mobile communication device's displaying means 124.

Mobile communication device 102 also includes a speaker 126 for publishing the decoded messages 122, 122' or the various functions being performed herein in audio. Speaker 126 may be any kind of speaker that is well known and used in the arts.

Computer processor 104 is housed within the mobile communication device 102 and includes computer executable instruction code 128, where the computer executable instruction code 128 is operative to perform all the necessary functions for the system 100 and methods disclosed herein, including but not limited to launching the code conversion app 110.

Computer executable instruction code 128 may be loaded directly on the mobile communication device's processor 104, or may be stored in the mobile communication device's memory means 106 such as, computer readable media that includes but is not limited to, a hard drive, a solid state drive, a flash memory, random access memory, CD-ROM, CD-R, CD-RW, DVD-ROM, DVD-R, DVD-RW, and the like. Computer executable instruction code 128 may be any type of computer executable instruction code 128, which may be in the form of a computer program, the program being composed in any suitable programming language or source code, such as C++, C, JAVA, JavaScript, HTML, XML, and other programming languages.

Computer executable instruction code 128 are operative to perform any and all the necessary functions for the system 100 and methods disclosed herein, which may include any one or more of the following: launch the code conversion app 110, which also comprises computer executable instruction code 128' readable by the mobile communication device's computer processor 104 and configured for performing any one or more of the following: interfacing with at least one or more social networks 112, 112' to retrieve the most recent message posts 130, 130' (e.g. TWEETS® or FACEBOOK® posts) for a user's account from the at least one or more social networks 112, 112'; transforming a display 132 of the retrieved most recent message posts 130, 130' from the at least one social network 112, 112', to mimic the display 132 on the at least one social network 112 and to include at least one radial button 134 for selecting at least one coded icon 114 corresponding to at least one decoded message 122; displaying the transformed display 136, which includes the most recent message posts 130, 130' from the at least one social network 112, and including the at least one radial button 134 for selecting the at least one coded icon 114 corresponding to the at least one decoded message 122; receiving a selection 138 of the at least one coded icon 114 corresponding to the at least one decoded message 122; converting the selected at least one coded icon 114 into the corresponding decoded message 122; and posting a link 120 reference in real-time for the corresponding decoded message 122 to the at least one social network 112 to the extent posting is user authorized for that social network 112. Simultaneously, while posting the link 120 reference to the at least one social network 112 code conversion application program's computer executable instruction code 128' is configured for posting the corresponding decoded message 122 on the user's wall 140 within the code conversion app 110.

In some embodiments, code conversion application program's computer executable instruction code 128' is configured for posting at least one or more icons 114, 114' or a link 120 reference on the user's wall 140 within the code conversion app 110 if a third party viewer is not authorized to view the decoded message 122.

In order to keep the communications private, the decoded message 122 is not readable as displayed on the (third-party) social network 112 and is posted as a link 120 reference on the select social network(s) 112, 112'. Code conversion application program's computer executable instruction code 128' is configured for generating the link 120 reference for the decoded message 122, requiring activation of the link 120 in order to view the decoded message 122; transmitting the link 120 reference to the at least one or more social networks 112, 112'; and redirecting the link 120 as activated to the code conversion app 110 for display of the decoded message 122 or one or more icons 114, 114'.

In some embodiments, code conversion application program's computer executable instruction code 128' is configured for fetching periodically the most recent message posts 130, 130' for the user's account from the at least one social network 112 and refreshing the transformed display 136 with the most recent message posts 130, 130' as retrieved and displaying the refreshed transformed display 136, which includes the most recent message posts 130, 130' from the at least one social network 112 as recently retrieved to the extent there are any changes, and including the at least one radial button 134 for selecting the at least one coded icon 114 corresponding to the at least one decoded message 122; posting the icons 114, 114' to unauthorized viewers on the user's wall 140 within the code conversion app 110; displaying a virtual touch-screen keyboard 116 that comprises a plurality of coded icons 114, 114' that correspond to decoded messages 122, 122', wherein the virtual touch-screen keyboard 116 is configured for receiving the selection of at least one icon 114 from the plurality of coded icons 114 corresponding to the decoded messages 122, 122', and/or the like.

In some embodiments, the code conversion app's computer executable instruction code 128' are further configured for displaying on the mobile communication's displaying means 124 confirmation of the posting of the decoded message 122, or receiving edits to the corresponding decoded message 122 associated with any one icon 114.

Displaying means 124 may include any kind of displaying means 124, such as, but not limited to: a liquid crystal display ("LCD") screen, a light emitting diode ("LED") display, touchpad or touch screen display, and/or any other means known in the arts for emitting a visually perceptible output. Mobile communication device's processor 104 is in electronic communication with its displaying means 124. In other embodiments, displaying means 124 is wirelessly connected to processor 104. Displaying means 124 may include control means, such as, but not limited to, a touch screen, selecting using a pointing device, roller ball, arrow keys, a stylus or any other control means used in the arts. In some embodiments, displaying means 124 may be electronically connected to a mobile communication device 102 according to the hardware and software protocols that are known and used in the arts. Processor 104 controls the mobile communication device's displaying means 124, which is configured for displaying the converted icon's decoded message 122 on the at least one displaying means 124; displaying confirmation of transmission of the decoded message 122; and/or displaying the link 120 reference to the decoded message 122 as posted on the social network 112 and the like.

Mobile communication device 102 also includes communication means 108 for transmitting or redirecting links 120, 120' to decoded message 122, 122' to or from one or more social network feeds on such social networks 112, 112'. In this manner, unless another social networker has access to the code conversion app 110 by viewing any one link 120 as posted to the social network 112, he/she will be unable to view the actual decoded message 122 since the decoded message 122 is not posted on the authorized social networks 112, 112'. Social network 112 as used herein describe an online social construct of a community of people with common interests who use a website or other technologies to communicate with each other and share information, or resources. In this manner, if John Doe is currently posting decoded messages 122, 122' on his wall 140 within the code conversion app 110, if John Doe authorizes the code conversion app 110 to publicize the posting on one or more third-party social networks 112, 112', e.g. FACEBOOK® and TWITTER®, the code conversion app 110 will transmit the link 140 reference to the decoded message 122 to both social network feeds in realtime, where the link 140 is displayed as being posted by user John Doe. Authorized, contacts or followers may view the actual decoded message 122 by activating the link 120 which redirects the viewer back to the code conversion app 110 where the decoded message 122 is displayed. Unauthorized viewers may activate the link 120, which redirects them to the code conversion app 110 that may offer the opportunity to join the online community on the code conversion app 110 and/or seek permission to view the decoded message 122.

In some embodiments, the decoded message 122 is posted on the user's wall 140 in the code conversion app 110 such that other authorized members (based on privacy settings) are able to view the decoded message 122 in plain view. In other embodiments, coded icons 114, 114' are posted on the user's wall 140 in the code conversion app 110 such that unless the viewer knows the meanings/translation of the coded icons 114, 114', the posted coded icons 114, 114' on the wall 140 are undecipherable.

Communication means 108 is electronically connected to the computer processor 104. In the case of electronic connections, the electronic connections may be wired and/or wireless. In some embodiments, communication means 108 may be a wireless communication means 108, which employ short range wireless protocol, such as, but not limited to, a radio frequency transceiver with integrated radio and shared antenna, a radio frequency receiver, and/or a radio frequency transmitter. In embodiments where the wireless communication means 108 is a radio frequency receiver, the radio frequency receiver may be any type of radio frequency receiver, including, but not limited to, a positioning system receiver, such as a Global Positioning System receiver and a local positioning system receiver, such as a Wi-Fi positioning system receiver. In other embodiments, the communication means 108 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 108 are operative to transmit or receive electronic communications, i.e. data, text, pictures, video, streaming data and the like via a short range wireless protocol, such as, but not limited to, a radio frequency receiver, a radio frequency transmitter, or a radio frequency transceiver. In some embodiments, communication means 108 are in mating engagement with an autonomous power source 142, e.g. a rechargeable battery.

Mobile communication device 102 may include one or more memory means 106 electronically connected to the at least one computer processor 104. In the case of electronic connections, the electronic connections may be wired and/or wireless connections. Memory means 106 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 106 may be used to store information, such as social networks 112, 112' linked to the user; decoded message 122, 122' associated with icons 114, 114', customized decoded message 122, 122' associated with any one or more icons 114, 114' and the like some of which may be stored in data elements 144. Stored information may be retrieved from memory means 106 using the computer processor 104.

Mobile communication device 102 also includes software components, e.g. an operating system ("OS") 146 that manages the hardware resources and other software components, by scheduling the various tasks to be accomplished by the processor 104 or input and output and memory allocation in the memory means 106 and the like. OS 146 acts as an intermediary between programs and the hardware components, and comprises of computer executable instruction code 128" to accomplish the various scheduling tasks. OS 146 may comprise of any one of the following operating systems, that may include but is not limited to ANDROID, BSD, IOS, GNU/LINUX, MAC OS X, MICROSOFT WINDOWS, WINDOWS PHONE, and IBM z/OS. In the exemplary mobile communication device 102, OS 146 resides in the memory means 106 as shown in FIG. 1A.

Mobile communication device 102 may include recording means 148 that may be any kind of recording device, such as, but not limited to, an audio recording device, such as a microphone, or a video recording device, such as a camera, or a combination of both an audio and a video recording device.

Mobile communication device 102 also includes location determining means 150, e.g. a Global Positioning Systems ("GPS") transponder as is well known and used in the arts, which upon activation, orients itself by searching for signals of GPS satellite network 103' and determines the absolute location 152 of the mobile communication device 102, which once determined may be stored in the mobile communication device's memory means 106.

System 100 further comprises of software components, e.g. the code conversion app 110. Code conversion app 110 may be any type of software application, such as a standalone application designed to run on a mobile platform, including an OS 146, such as IOS™, ANDROID™, WINDOWS MOBILE™, BLACKBERRY™, and the like. Code conversion app 110 may be operative for an iPhone, other "smart phones", mobile communication devices, cellular phones, PDAs, GPS or any other mobile communication devices 102 capable of handling transactions dealing with dynamic content, object, application, or software. In another embodiment, the app 110 may be designed to run on a social network platform, such as FACEBOOK™ or JUSTSYNC™.

In some embodiments, code conversion app 110 may reside on a server computer 154 (not shown) where the code conversion app 110 maybe downloadable to the mobile communication device 102 from the server computer 154 (not shown). As such, social network user may customize the icons 114, 114' (e.g. modifying the corresponding decoded message 122, 122' associated with the icons 114, 114') remotely from the mobile communication device 102 where the information is synchronized in realtime or shortly thereafter. Code conversion app 110 may comprise in part of a browser, such as for use on the mobile communication device 102, (such as an iPhone, Blackberry, or other smart phone) and the full-sized software program may be on the server computer 154 (not shown), where communications may occur over a network 103 or directly, either wired or wirelessly.

Figure 1B:
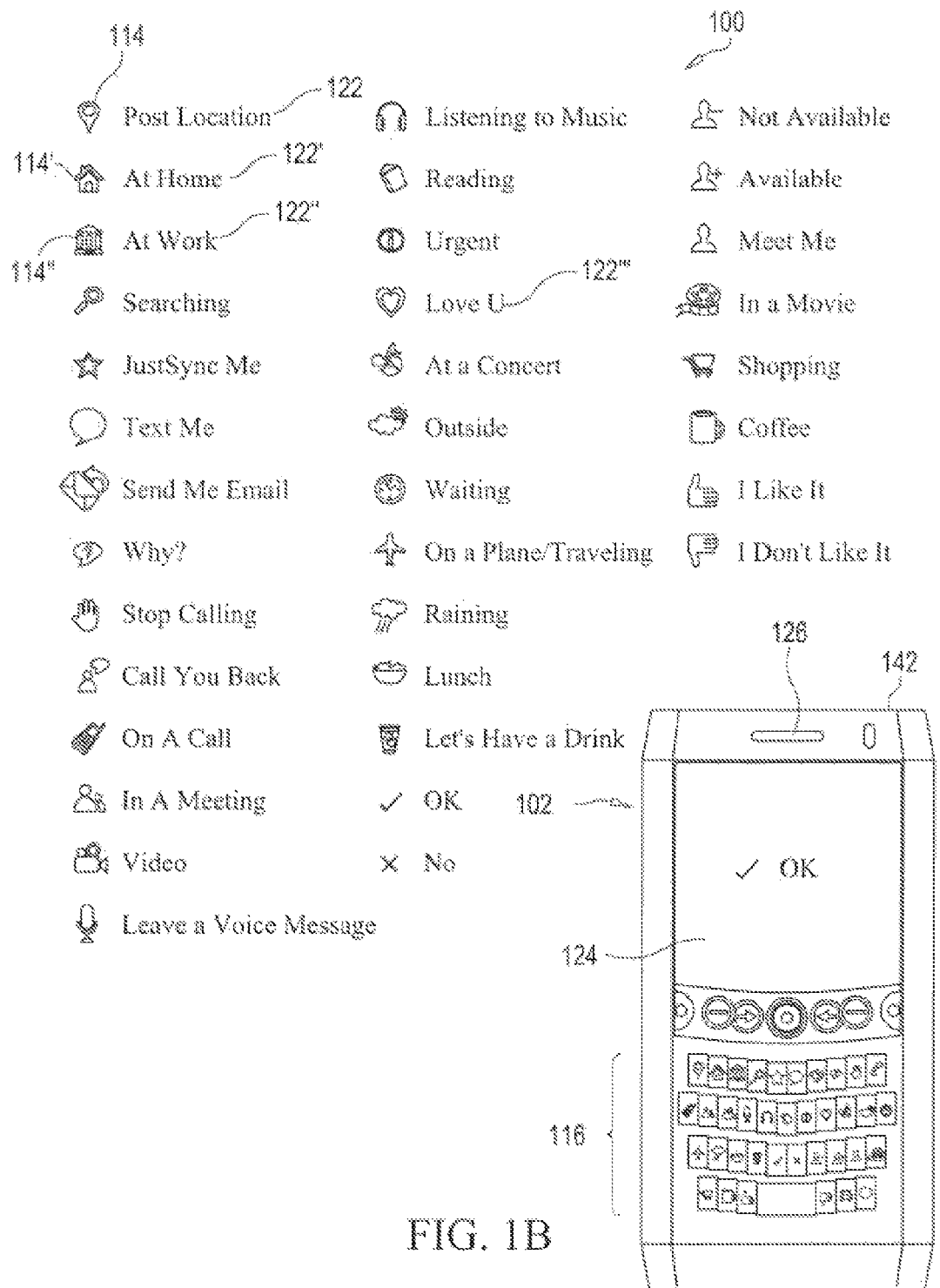

In yet another embodiment, when the code conversion app 110 is downloaded to the mobile communication device 102 from the server computer 154, the user may customize the icons 114, 114' viewable from a list 118 of icons 114, 114' or as displayed on a virtual keyboard 116 of icons 114, 114' as shown in FIG. 1B. Server computer 154 (not shown) includes but is not limited to a network enabled computer, a laptop or personal digital assistant subject to wired/wireless connectivity, which is configured with a computer processor 104'.

Code conversion app 110 is configured for receiving user supplied icons 114, 114'; converting the icons 114, 114' to decoded message 122,122' for transmissions to social network feeds for posting on one or a plurality of social networks 112, 112'; interfacing with one or more social networks 112, 112' for providing the decoded message 122, 122' to be posted thereon; receiving customized edits to one or more decoded message 122,122' corresponding to one or more icons 114, 114'; and linking to at least one social network 120 based on the social network 120 selected as the access point at the time of user login to the code conversion app 110.

Code conversion app 110 may reside with application manager 156 that is stored in the memory means 106, wherein the application manager 156 manages any one or more software applications stored on the mobile device 102 and the functionality of these applications, e.g. which software application needs to run in background or foreground mode and the like.

FIG. 1B is an exemplary embodiment of the system 100 according to one embodiment. An exemplary legend for the icons 114, 114', 114" is shown in FIG. 1B for ease of reference, where each icon 114 represents a different decoded message 122, e.g. the icon 114 depicting "a heart" corresponds to decoded message 122, "Love u"; icon 114' depicting "an airplane," corresponds to "On a plane/Travelling" and the like. A user may launch the code conversion app 110 via a radial button 134 or code conversion app icon 114' such that when a user selects an icon 114 (e.g., by touching a touchscreen, or selecting it using a pointing device, roller ball, arrow keys, or other controller) from a virtual keyboard 116 or list 118, user may use the icons 114, 114' to post his/her decoded message 122, 122' on a social network 112.

FIGS. 1C-1G are exemplary embodiments of the system 100 in use according to one embodiment. User may log into the code conversion app 110 using any one of user's social network accounts' 112, 112' login, e.g. FACEBOOK®, TWITTER® or JUSTSYNC® and the like. Code conversion app 110 interfaces with the social network feed such that the user is logged in to the social network 112 of his/her choice, e.g. FACEBOOK® and still has the ability to post decoded message 122, 122' displayed as a link 120 reference to said social network 112 in realtime.

Figure 1C:
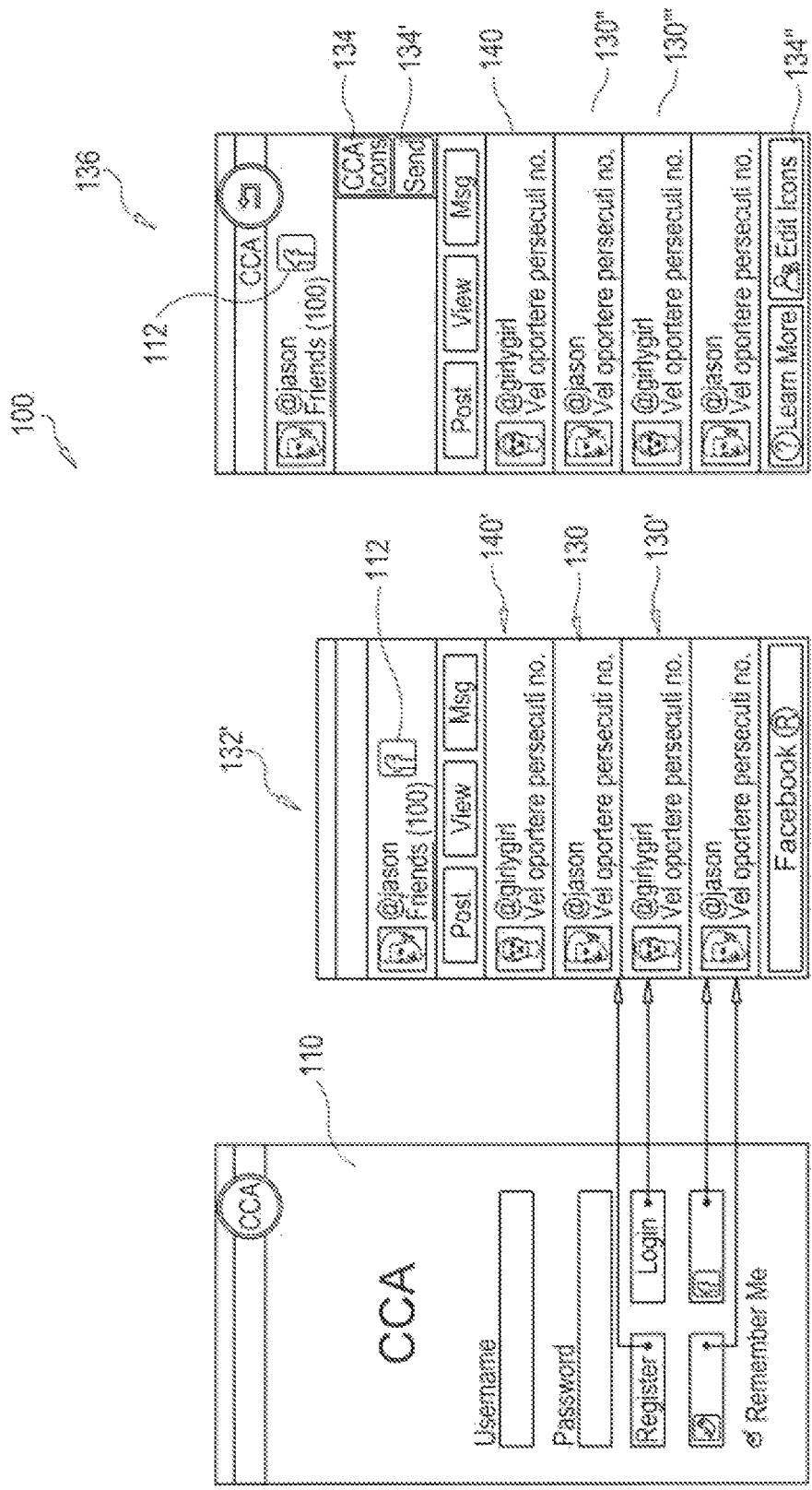
FIGS. 1C-1G are exemplary embodiments of the system in use according to one embodiment.

As shown in FIG. 1C, the code conversion app 110 interfaces with an exemplary social network 112, FACEBOOK®, retrieves the most recent message posts 130, 130' for the user's account as posted on the user's wall 140' on the social network 112, transforms the display 132 of the retrieved most recent message posts 130, 130' to mimic the display 132 on the at least one social network 112 to include at least one radial button 134 for selecting at least one coded icon 114 corresponding to at least one decoded message 122. Code conversion app 110 displays the transformed display 136, which includes the most recent message posts 130, 130' from the at least one social network 112 and including the at least one radial button 134 for selecting the at least one coded icon 114 corresponding to the at least one decoded message 122. In this manner, the process appears more or less seamless to the social network user as the transformed display 136 is very similar to the original display 132 as posted on the social network 112. As a reminder to user of the social network 112 accessed, the social network's logo may appear on the transformed display 136.

Figure 1D:
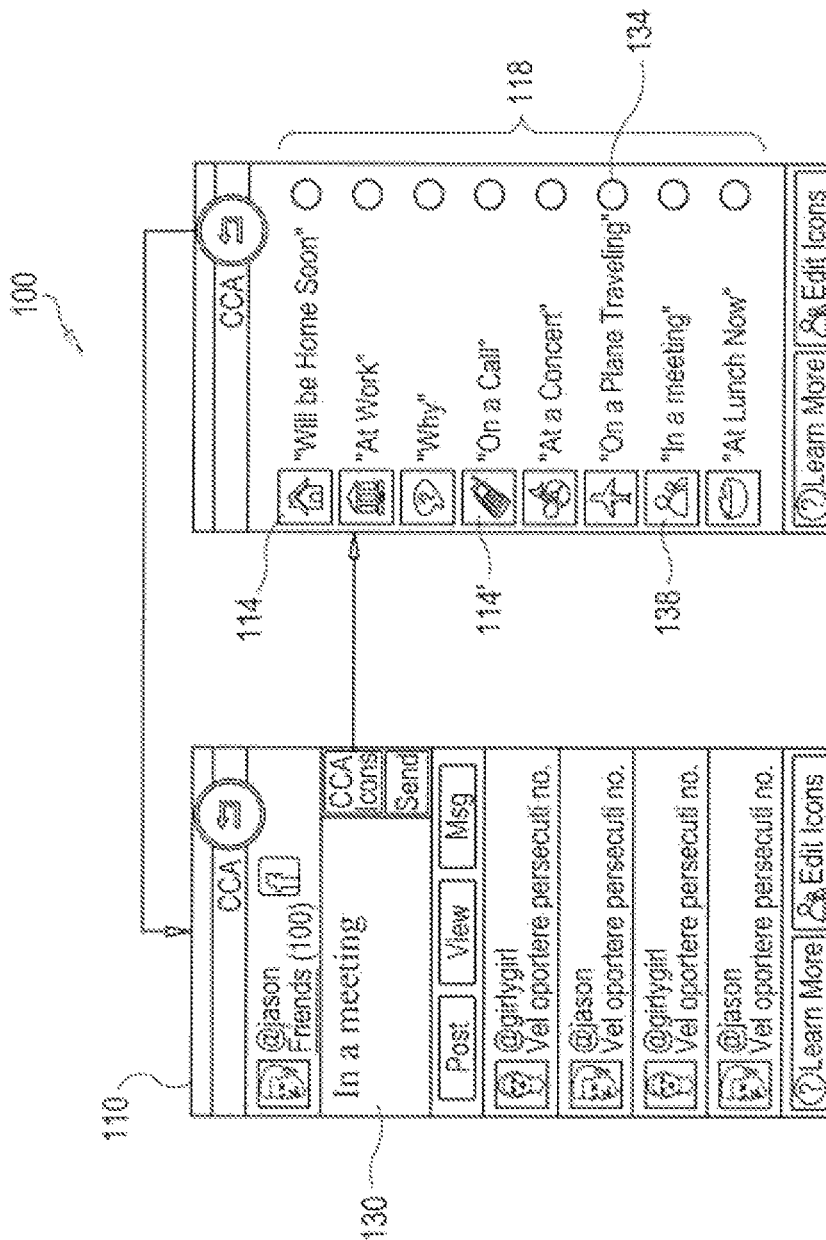
Figure 1E:
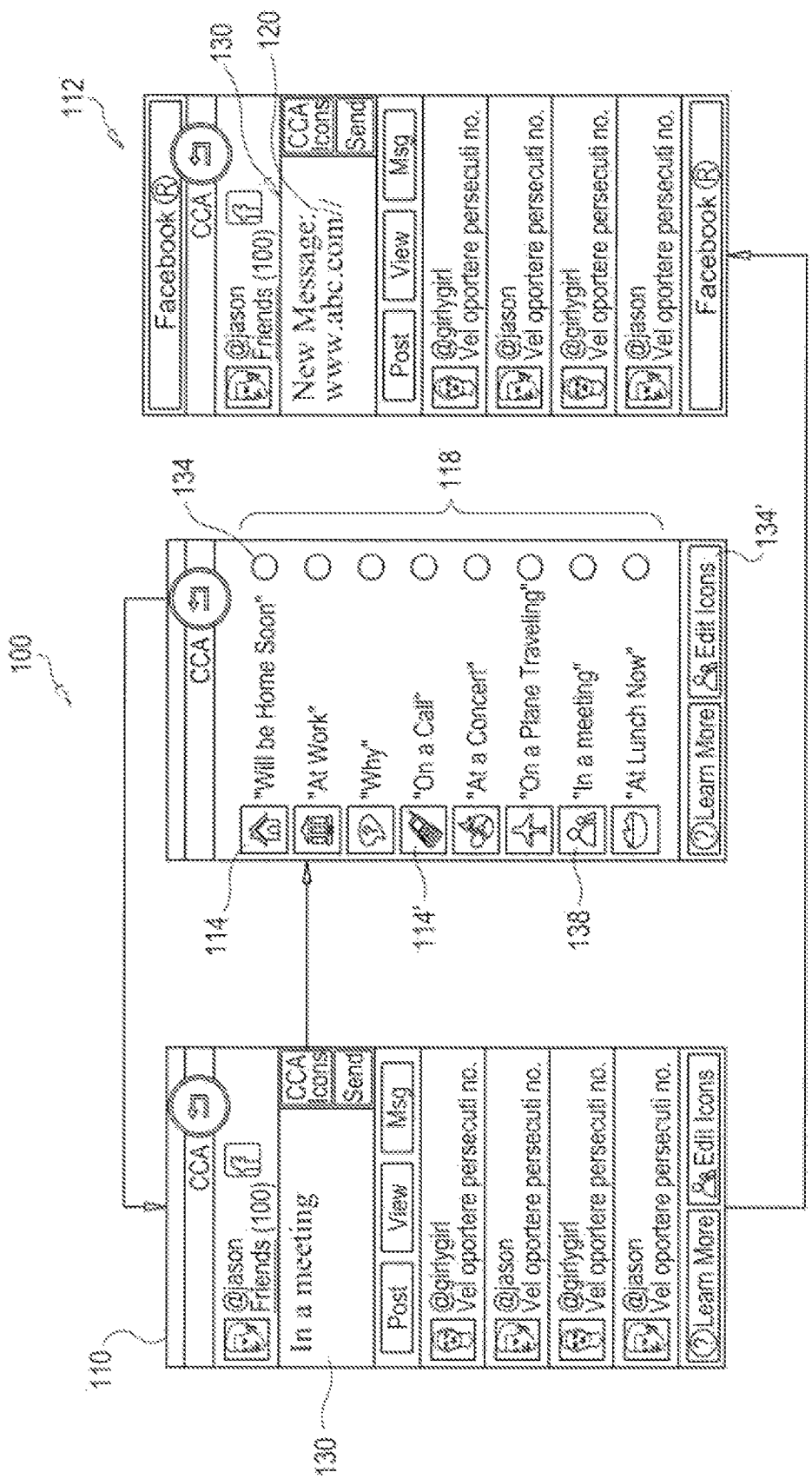

As shown in FIGS. 1D & 1E, using a radial button 134, user may make a selection 138 of a coded icon 114 from a list 118 of a plurality of icons 114, 114' or from a virtual keyboard 116 of icons 114, 114', which may be confirmed prior to posting. Code conversion app 110 receives the selection 138 of the at least one coded icon 114 corresponding to the at least one decoded message 122 for posting on the code conversion app 110 or as a link 120 reference on the social network 112.

Illustratively as shown, user may activate or press the corresponding icon 114 or radial button 134 for decoded message, "IN A MEETING" for which a visible display of the decoded message 122 "IN A MEETING" may be displayed on the mobile communication device's displaying means 112 for posting on the code conversion app 110 and one or more social networks 112, 112' to the extent the user has authorized such postings. The posting will be executed in realtime so that conceivably other members of the code conversion app 110 or the social network 112 selected that are logged in to the app 110 can see the message post 130 (decoded messages 122, 122' or icons 114, 114') immediately in realtime from the user's wall 140. Correspondingly, users of the social network 112 are similarly notified in realtime of the new message post 130.

Figure 1F:
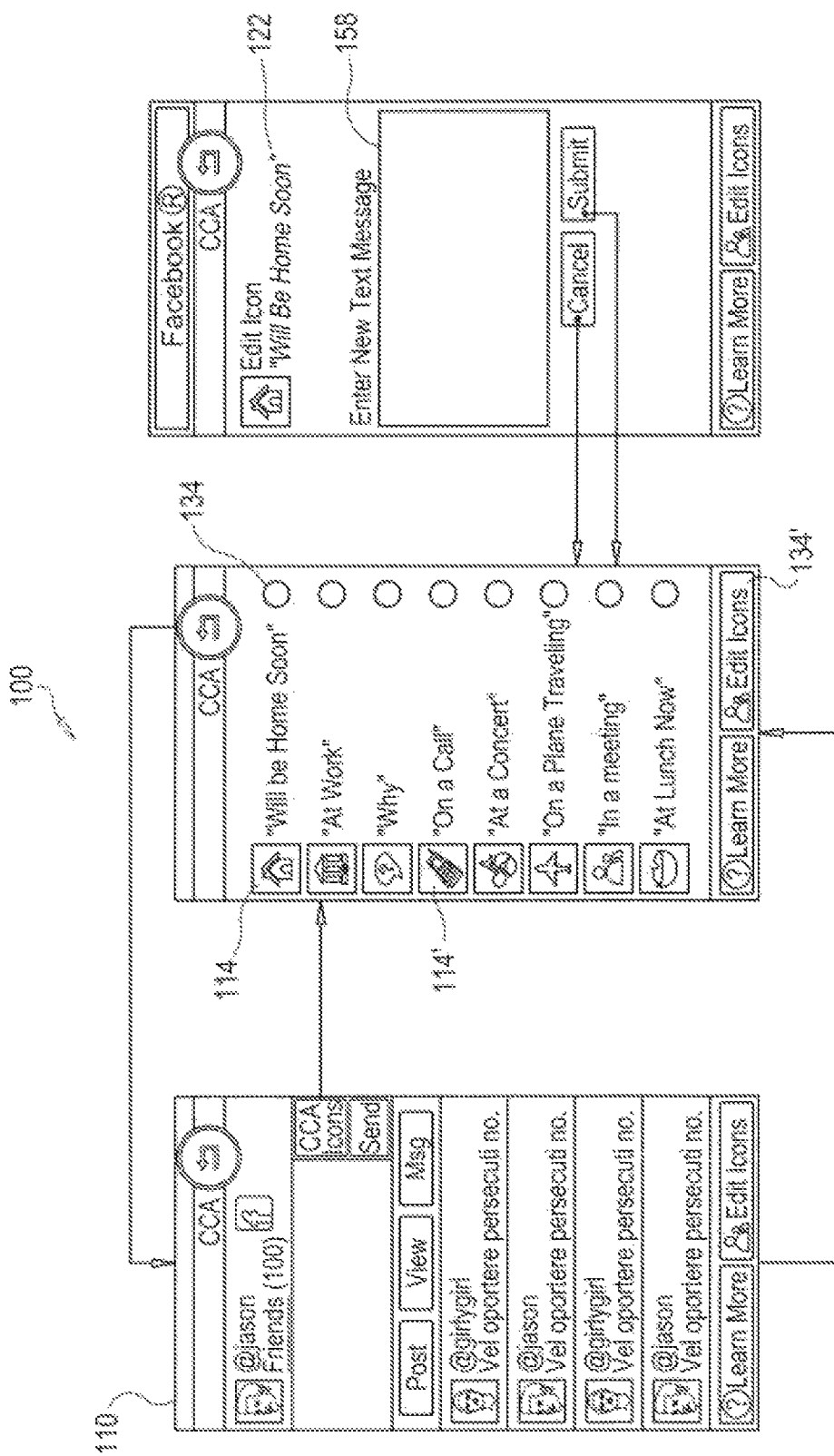

Icons 114, 114' may be edited using a radial button 134" programmed for opening an editor module 158 of the code conversion app 110 configured for receiving user customization, e.g. edits to decoded message 122 associated with an icon 114 as shown in FIG. 1F. User may select the icon 114 to be customized, e.g. as shown the icon 114 corresponding to the decoded message 122 "WILL BE HOME SOON", whereby code conversion app 110 may sequentially transition user to another screen where user may enter his/her customized edits to the decoded message 122 for the selected icon 114, which can be used to submit the customized decoded message 122 to one or more social network feed for posting on the social networks 112, 112' and which may be saved in data elements 144 in the memory means 106 for future use of the same icon 114. For example, a priest may modify the decoded message for "AT HOME" to mean "AT CHURCH"; and a student may modify the decoded message 122 that has an icon 114 for an open book that previously corresponds to the decoded message 122 "READING" to represent "STUDYING." In this manner, the user may customize the decoded message 122 for more appropriate expressions of his/her activities and a private language communicated only to those privy to the meanings of the icons 114, 114'.

Figure 1G:
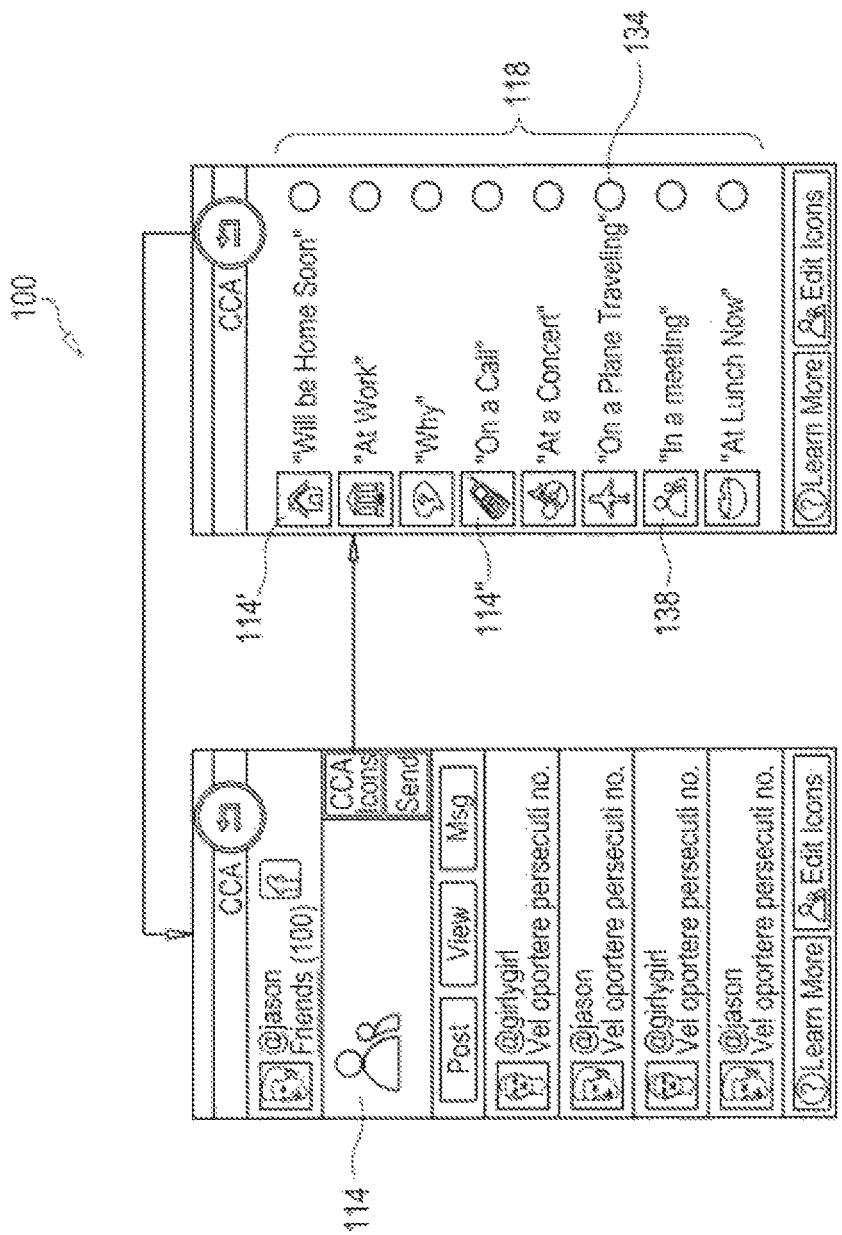

As shown in FIG. 1G, in some embodiments, user has the option of posting icons 114, 114' on the code conversion app 110 such that authorized and unauthorized viewers alike will see the icons 114, 114'. Except the authorized viewers more than likely will know and understand what the icons 114, 114' mean, while an unauthorized viewer more than likely will not. converts the selected at least one coded icon 114 into the corresponding decoded message 122 and generates a link 120 reference to the decoded message 122 such that the decoded message 122 is not readable as displayed on the social network 112 at it will require activation of the link 120 (by an authorized viewer) in order to view the decoded message 122. Code conversion app 110 transmits the link 120 reference to the at least one social network feed for posting the link 120 reference in realtime to the at least one social network 112 to the extent posting is user authorized as shown in FIG. 1E.

Figure 2A:
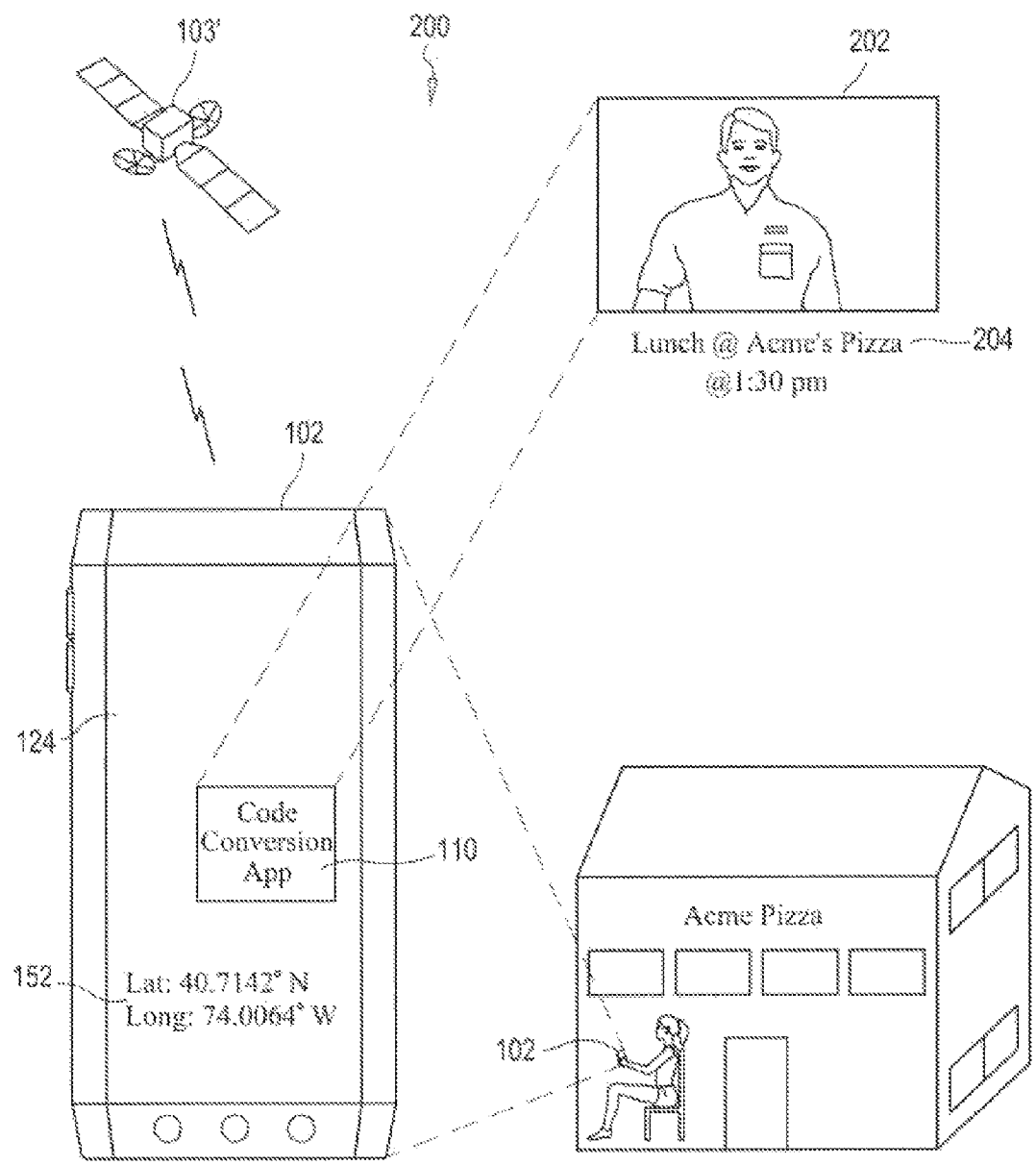
FIGS. 2A-2C show exemplary embodiments of the system and method of the code conversion application program in use according to one embodiment.

FIG. 2A shows an example of the system 200 in use according to one embodiment. In some embodiments, the code conversion app 110 allows users to post a video 202 on his or her wall of the code conversion app 110 or another social network 112 from his/her absolute location 152. Code conversion app 110 may appear as an icon 114 that may be manually activated to launch the app 110, while in some embodiments the code conversion app 110 is automatically launched as soon as the mobile communication device 102 is turned on. In either embodiment, once the code conversion app 110 is activated, the mobile communication device's recording means 148 may start recording at least one or more videos 202, 202' at his/her current location. The at least one video 202 may be any type of video, including, but not limited to, a live video, a live music video, a streamed music video, a pre-recorded music video, and the like. In some embodiments, the length of the at least one video 202 may be based on a prescribed period of time, e.g. 45 seconds, 3 minutes, 5 minutes or 10 minutes, etc. In other embodiments, the length of the video 202 is unrestricted.

The location determining means 150 orients itself by searching for signals of GPS satellite constellation network 103' and determines the absolute location 152 of the mobile communication device 102, which once determined may be stored in the mobile communication device's memory means 106. The code conversion app 110 provides for the input of a description 204 of the recorded video 202 providing additional disclosure to all authorized viewers once the recorded video 202 is posted on the social network 112. In some embodiments, code conversion app 110 allows user to use the icons 114, 114' to describe the absolute location 152 of the user or user description 204 to be transmitted to the social network feeds for posting on the social networks 112, 112'. Illustratively, an icon 114 associated with corresponding decoded message 122, "LUNCH" may be used to construct the description 204 "LUNCH AT ACME PIZZA" accompanying the recorded video 202. In another embodiment, user may consider "ACME PIZZA" a favorite spot and thus customize the icon 114 associated with decoded message 122, "Lunch" to "LUNCH AT ACME PIZZA" and as such in providing the description 204 of the recorded video 202 in posting the recorded video 202, merely inputs the icon(s) 114 to describe the same.

Figure 2B:
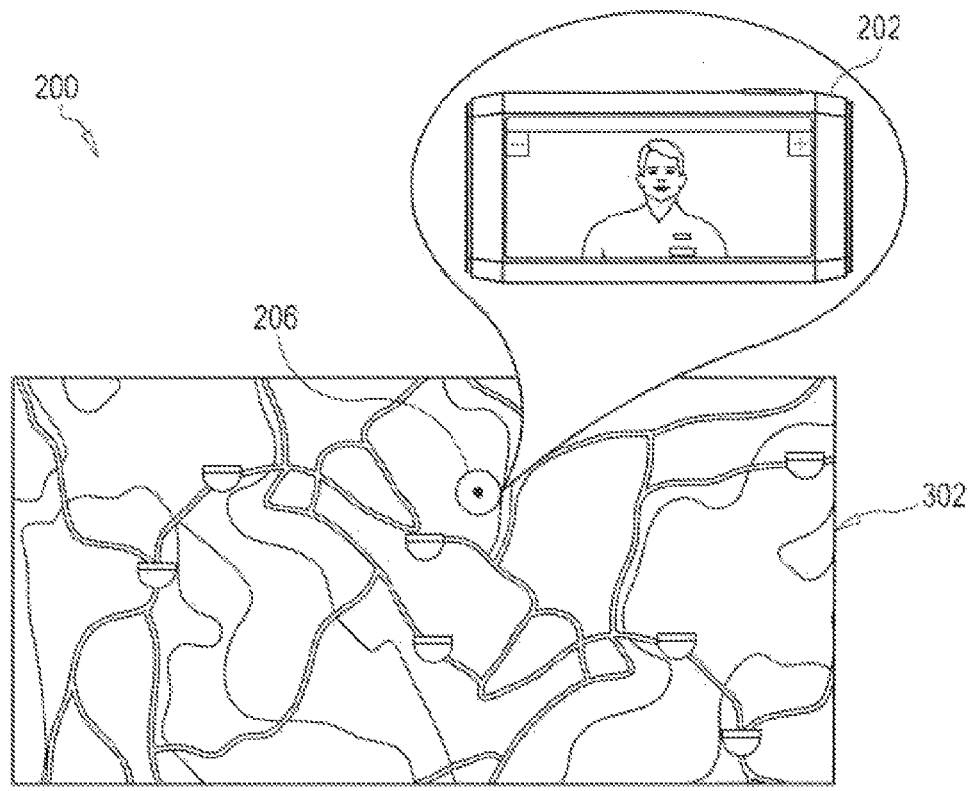
Figure 2C:
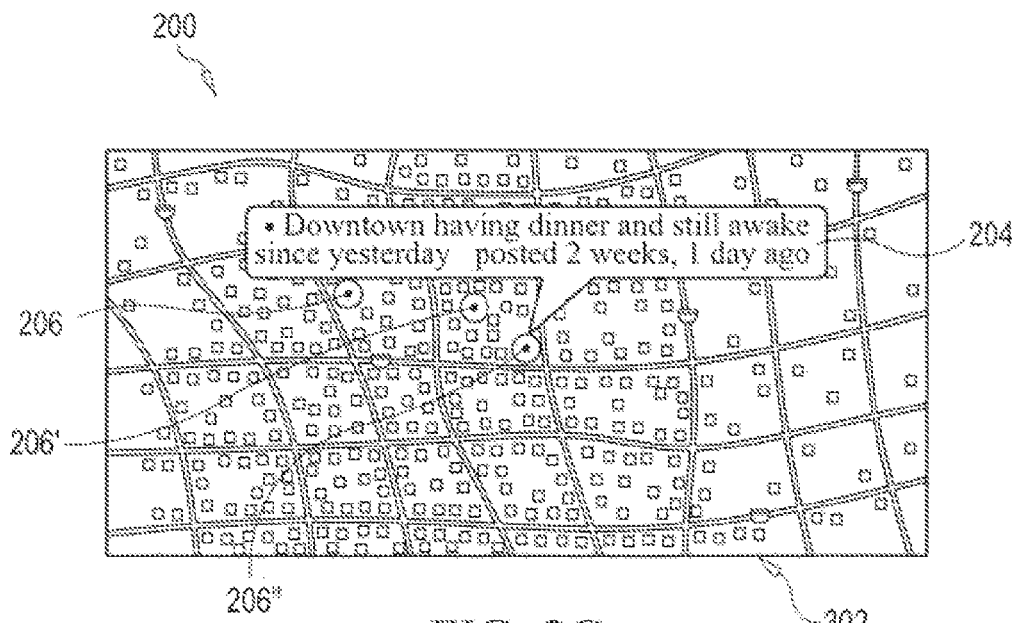

FIGS. 2B & 2C show exemplary embodiments of the system 300 and method of the code conversion app 110 in use according to one embodiment. User may post his/her videos 202, 202' with descriptions 204, 204' as video map locations 206, 206' using the code conversion app 110. Video map location 206 as used herein describes a recorded video 202 of user's absolute location 152 that may include a description 204 that is published on the user's wall 140 on the code conversion app 110 or a social network 112 as a clickable icon 114''' on a map display 208. As such, authorized members of the user's social network 112 may view the map display 208, click on the video map locations 206, 206' for viewing of the video 202. Authorized viewers may hear comments, postings, etc., concerning the one or more absolute locations 152, 152' visited or the user's comments and views as recorded at the particular absolute location 152.

As shown in FIG. 2C, in reviewing the map display 208, a third party viewer is able to see at a glance the expanse of the geographical region covered by the user/videographer using the mobile communication means 102. As can be appreciated, several varying useful utilities can be generated from the system 100 and methods disclosed herein as users may even invent a game to see who is able to visit the most absolute locations 152, 152' in the shortest timespan.

In some embodiments, the video map location 206 may be linked with a message post 130 for a particular absolute location 152 without being linked to a corresponding recorded video 202 as shown in FIG. 2C. In that embodiment, the clickable video map locations 206, 206' may be displayed on the map display 208 and accessed by either clicking on the video map locations 206, 206' or using control means, a touch screen display to access and activate the description 204. In some embodiments, the video map locations 206, 206' is readily displayed on the map display 208 without having to individually click the video map location 206 for further displaying of the description 204. As previously stated, the coded icons 114, 114' may be used to create the description 204 posted on the map display 208 where one or more coded icons 114, 114' are converted to decoded messages 122, 122' for posting on the map display 208 on the social network 112 or the code conversion app 110.

Methods

Figure 3:
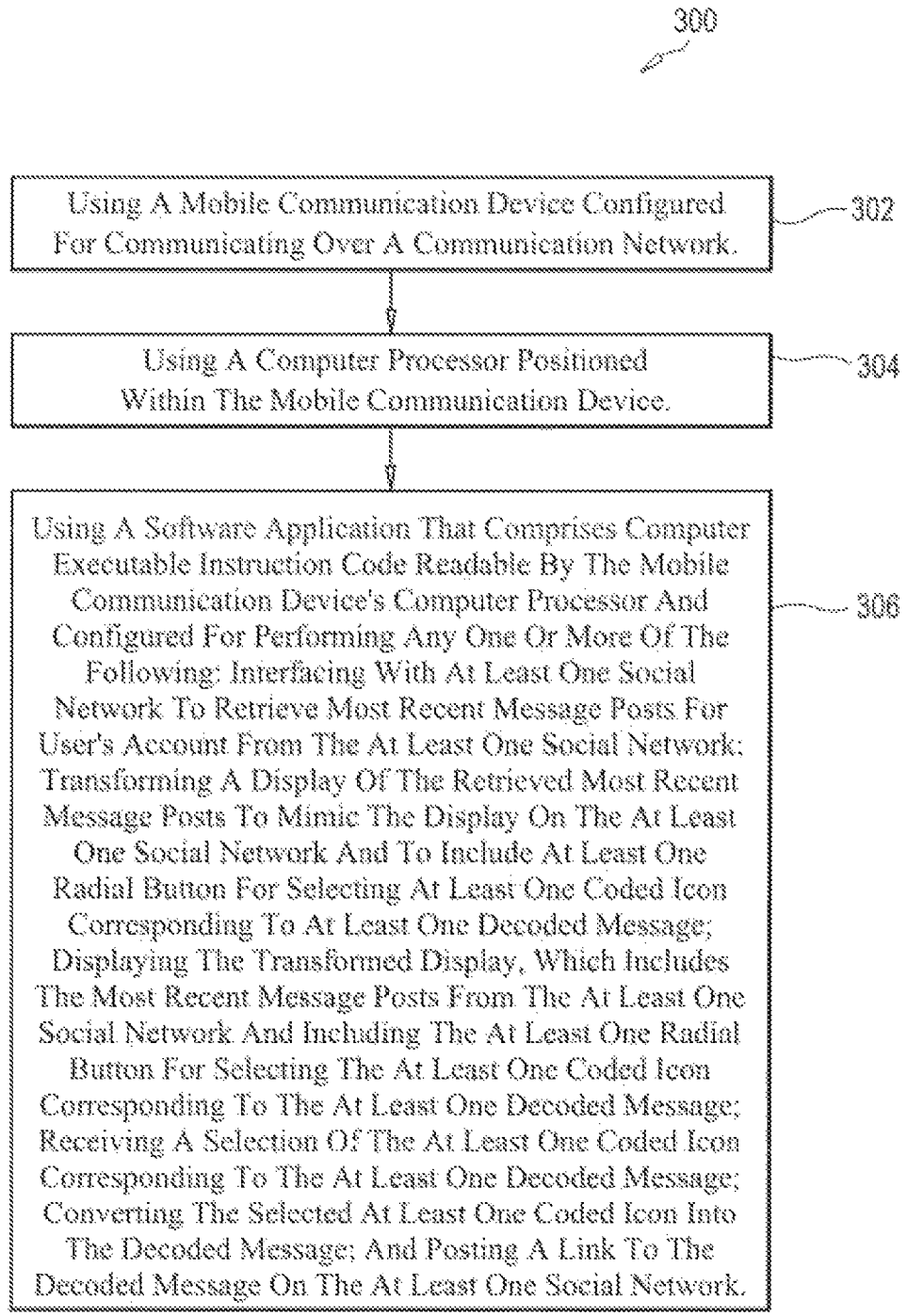
FIG. 3 is a flowchart of block diagram of an exemplary method according to one embodiment of the invention.

FIG. 3 is a sample flowchart of block diagram of an exemplary method 300 according to one embodiment of the invention. Method 300 comprises of using a mobile communication device 102, which is a network enabled computer device configured for communicating over a communication network 103 (step 302); using a computer processor 104 positioned within the mobile communication device 102 (step 304). Processor 104 may include any type of computer processors, such as, but not limited to, a central processing unit (CPU), a microprocessor, a video processor, a front end processor, a coprocessor, a single-core processor, a multi-core processor, as well as any known computer processor 104 that's used in the arts.

Method 300 further comprising using a software application program 110 that comprises computer executable instruction code 128' readable by the mobile communication device's computer processor 104 and configured for performing any one or more of the following: interfacing with at least one or more social networks 112, 112' to retrieve the most recent message posts 130, 130' (e.g. TWEETS® or FACE-BOOK® posts) for a user's account from the at least one or more social networks 112, 112'; transforming a display 132 of the retrieved most recent message posts 130, 130' from the at least one social network 112, 112', to mimic the display 132 on the at least one social network 112 and to include at least one radial button 134 for selecting at least one coded icon 114 corresponding to at least one decoded message 122; displaying the transformed display 136, which includes the most recent message posts 130, 130' from the at least one social network 112, and including the at least one radial button 134 for selecting the at least one coded icon 114 corresponding to the at least one decoded message 122; receiving a selection 138 of the at least one coded icon 114 corresponding to the at least one decoded message 122; converting the selected at least one coded icon 114 into the corresponding decoded message 122; and posting a link 120 reference in real-time to the at least one social network 112 to the extent posting is user authorized for that social network 112 (step 306).

Software application program 110, i.e. the code conversion app 110 may be any type of software application, such as a standalone application designed to run on a mobile platform, including an OS 146, such as IOS™, ANDROID™, WINDOWS MOBILE™, BLACKBERRY™, and the like. Code conversion app 110 may be operative for an iPhone, other "smart phones", mobile communication devices, cellular phones, PDAs, GPS or any other mobile communication devices 102 capable of handling transactions dealing with dynamic content, object, application, or software. In another embodiment, the app 110 may be designed to run on a social network platform, such as FACEBOOK™ or JUSTSYNC™.

Figure 4:
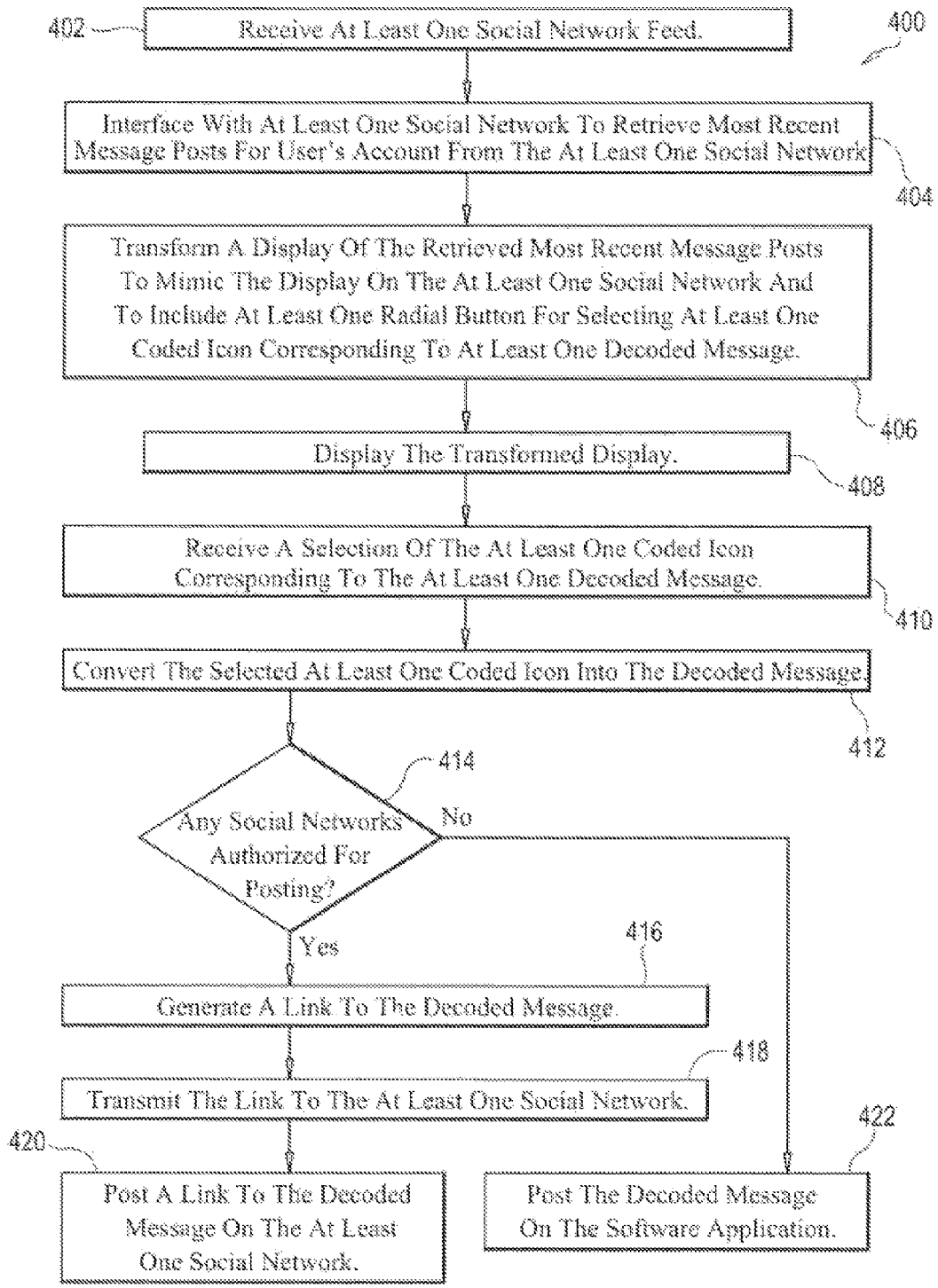
FIG. 4 is a flowchart of block diagram of an exemplary method according to one embodiment of the invention.

FIG. 4 describes a flowchart of a block diagram of an exemplary method 400 using the code conversion app's computer executable instruction 128 according to one embodiment. Method 400 comprises of receiving at least one or more social network feeds pursuant to a login to the social network 112 used to access the code conversion app 110 (step 402) which may allow a plurality of concurrent logins to more than one social network 112, 112'; interfacing with at least one social network 112 as per the login to retrieve the most recent message posts 130, 130' for the user's account from the at least one or more social networks 112 (step 404).

Method 400 further comprises transforming a display 132 of the most recent message posts 130, 130' as retrieved from the at least one social network 112 to mimic the display 132 on the at least one social network 112, wherein the transformed display 136 also includes at least one radial button 134 for selecting at least one coded icon 114 corresponding to at least one decoded message 122 (step 406). Method 400 further comprises displaying the transformed display 136, which includes the most recent message posts 130, 130' from the at least one social network 112 and including the at least one radial button 134 for selecting the at least one or more coded icons 114, 114' corresponding to the at least one decoded message 122 (step 408); receiving a selection 138 of the at least one coded icon 114 corresponding to the at least one decoded message 122 (step 410); and converting the selected at least one coded icon 114 into the corresponding decoded message 122 (step 412).

Method 400 comprises of determining whether the code conversion app 110 has authority to post the corresponding decoded message 122 on at least one or more social networks 112, 112', (step 414) e.g. the social network 112 used to login to the code conversion app 110 and any others. If no third-party social networks 112, 112' are authorized for postings, method 400 is directed to step 422 for posting the decoded message 122 on the code conversion app 110 (step 422). However, if at least one or more social networks 112, 112' are authorized by user to receive postings, method 400 comprises generating a link 120 reference to the decoded message 122 (step 416) and transmitting the link 120 reference in realtime to the at least one social network 112 feed that the user has authorized for posting at least one or more link 120 references to the decoded message 122 (step 418). Method 400 further comprises of posting a link 120 to the decoded message 122 on the at least one or more social networks 112, 112' (step 420) and simultaneously posting the decoded message 122 on the code conversion app 110 (step 422).

In some embodiments, based on privacy settings within the code conversion app 110, user may prevent unintended recipients from reviewing the decoded message 122. As such, code conversion app 110 may post on his/her wall within the code conversion app 110, either the coded icons 114, 114' or a link 120 reference to the coded message 122 when viewed by unintended recipients.

In some embodiments, code conversion app 110 is further configured for fetching periodically the most recent message posts 130, 130' for the user's account from the at least one social network 112 and refreshing the transformed display 136 in the manner previously described. The refreshing process may be programmed to occur every 1, 3 or 5 minutes or for any duration the code conversion app 110 system administrator believes is feasible to allow the user to enjoy the experience of realtime posting and responding to message posts 130, 130' on the social network 112 that is being simulated on the code conversion app 110 such that the user's experience appears seamless. Once the transformed display 136 has been refreshed, the code conversion app 110 is configured for further displaying the refreshed transformed display 136, which includes the most recent message posts 130, 130' from the at least one social network 112 as refreshed and including the at least one radial button 134 for selecting the at least one coded icon 114 corresponding to the at least one decoded message 112.

Figure 5:
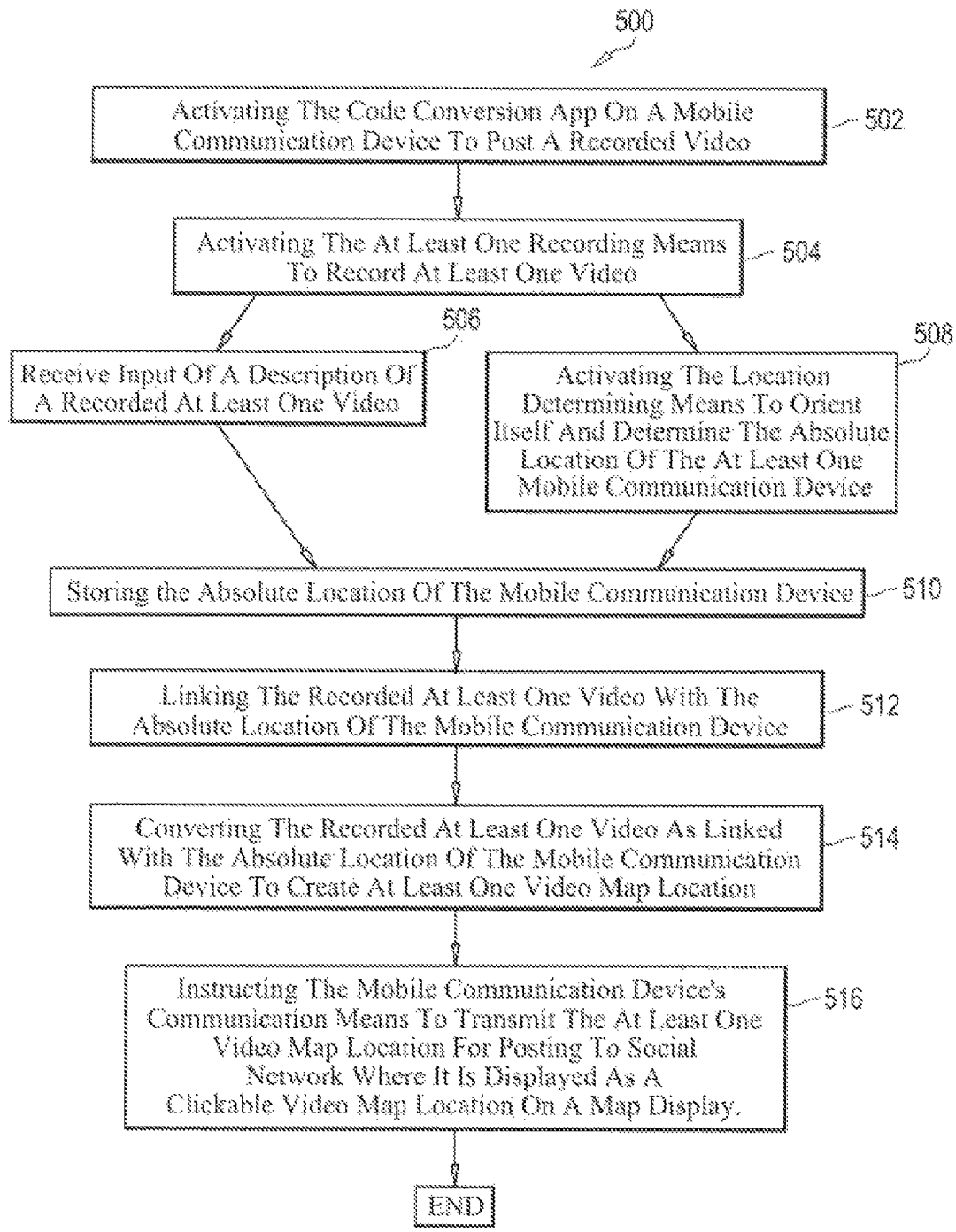
FIG. 5 is a flowchart of a block diagram of an exemplary method of transmitting at least one decoded message according to another embodiment.

FIG. 5 is an exemplary method 500 of the invention according to one embodiment. Method 500 comprises of activating the code conversion app 110 on a mobile communication device 102 to post a recorded video 202 (step 502). Method 500 further comprises activating the at least one recording means 148 to record at least one video 202 (step 504). Recording means 148 may include any kind of recording device, such as, but not limited to, an audio recording device, such as a microphone, or a video recording device, such as a camera, or a combination of both an audio and a video recording device. The at least one video 202 may be any type of video, including, but not limited to, a live video, a live music video, a streamed music video, a pre-recorded music video, and the like. In some embodiments, the length of the at least one video 202 may be based on a prescribed period of time, e.g. 55 seconds, 3 minutes, 5 minutes or 10 minutes, etc. In other embodiments, the length of the at least one recorded video 202 is unrestricted.

Code conversion app 110 receives input of a description 204 of a recorded at least one video 202 (step 506) using at least one or more icons 114, 114' from a list 118 or virtual keyboard 116 that comprises of a plurality of coded icons 114, 114' from a software application 110, e.g. "DOWNTOWN. HAVING DINNER AND STILL AWAKE SINCE YESTERDAY." In some embodiments, the description 204 of the recorded at least one video 202 may be limited to a stated number of characters, or icons 114, 114', whereas in other embodiments, the length of the description 204 at least one recorded video 202 is unlimited. In some embodiments, date and time information are also attached to the recorded video 202 and is available for display when viewed by clicking the clickable video map locations 206, 206' on the map display 208.

In some embodiments, once the mobile communication device 102 is turned on, the location determining means 150 is activated. In some embodiments, when the code conversion app 110 is launched the location determining means 150 is automatically activated while in some embodiments the location determining means 150 is selectively activated. In either embodiments, method 500 includes activating the location determining means 150 to orient itself and determine the absolute location 152 of the at least one mobile communication device 102 (step 508) simultaneously while the video 202 is being recorded. Method 500 further comprises storing the absolute location 152 of the mobile communication device 102 in the mobile communication device's memory means 106 (step 510). In this manner if the mobile communication device 102 has no satellite reception and transmission is not available, the video 202, absolute location 152, description 204 of the video 202 and/or the video map location 206 may be stored for future transmission when possible.

The computer executable instruction code 128 of the code conversion app 110 are further operative for linking the recorded at last one video 202 with the absolute location 152 of the mobile communication device 102 (step 512); converting the recorded at least one video 202 as linked with the absolute location 152 of the mobile communication device 102 to create at least one video map location 206 (step 514); and instructing the mobile communication device's communication means 108 to transmit the at least one video map location 206 for posting to a social network 112 where it is displayed as a clickable video map location 206 on a map display 208 (step 516) on the code conversion app.

In some embodiments, method 500 further comprises receiving a request to post the recorded video map location 206 to the code conversion app or another third-party social network 112. Once the user/videographer elects to post the video map location 206, the mobile communication device's communications means 108 transmits the recorded video 202 and absolute location 152 that has been converted into a video map location 206 to the code conversion app 110, where the video map location 206 is represented graphically on a map display 208 by a clickable video map location 206 for viewing by authorized third-parties depending on the user's privacy settings. In some embodiments, depending on the number of posted video map locations 206, 206' the map display 208 may be graphically depicted larger or smaller to graphically represent all the video map locations 206, 206' indicative of the geographical area traveled by the videographer in recoding the posted video map locations 206, 206', where for example the user may have a plurality of recorded videos 202, 202', 202" converted into video map locations 206, 206' and displayed as clickable video map locations 206, 206'. In that event, the map display 208 may cover a more expansive geographical area in order to accurately post the video map locations 206, 206' in the various absolute locations 152, 152' of the user as recorded. In some embodiments, the map display 208 is expandable regardless of the number of video map locations 206, 206'.

Figure 6:
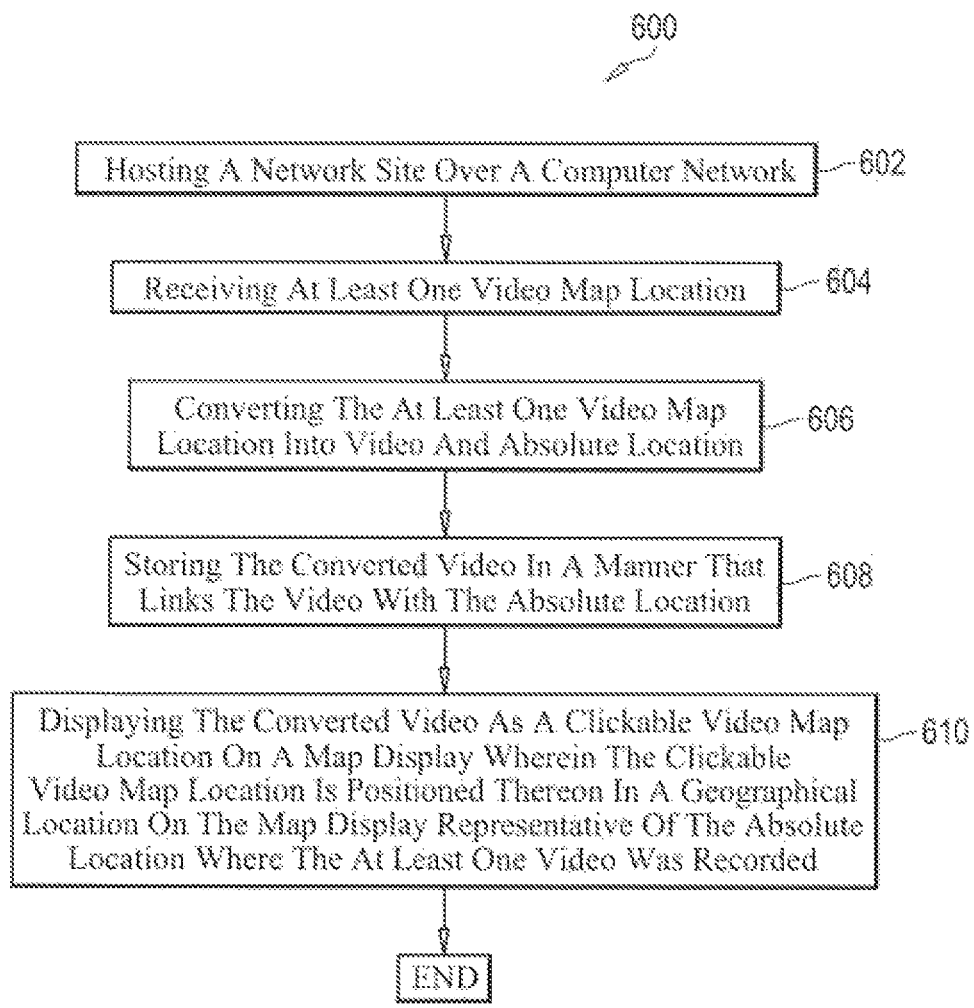
FIG. 6 describes a sample flowchart of a block diagram of an exemplary method of calendaring an event.

FIG. 6 is an exemplary method 600 of the invention according to one embodiment. Method 600 comprises of the server computer 154 hosting the code conversion app 110 that is configured for providing social networking service over a computer network 103 (step 602). The code conversion app 110 includes computer executable instruction code 128' readable by the at least one computer processor 104, and operative for receiving at least one video map location 206 (step 604); converting the at least one video map location 206 into video 202 and absolute location 152 (step 606); storing the converted video 202 in a manner that links the video 202 with the absolute location 152 (step 608); and displaying the converted video 202 as a clickable video map location 206 on a map display 208 wherein the clickable video map location 206 is positioned thereon in a geographical location on the map display 208 representative of the absolute location 152 where the at least one video 202 was recorded (step 610).

In some embodiments, method 600 further comprises of providing for the downloading and playing of the at least one video 202 when the clickable video map location 206 is clicked, representative of the various absolute locations 122, 122' that the videos 202, 202' were recorded wherein code conversion app 110 may provide public access to the map display 302 with the clickable video map location 206 dependent on the security settings for the user of the code conversion app 110. In some embodiments, once the video map location 206 is clicked, the at least one recorded video 202 is pulled from the server's memory means 106.'

In a further embodiment, instant messaging function may be any type of instant messaging function, such as a private one on one instant messaging, a private group instant messaging session (such as a chat room), or a public instant messaging session. In some embodiments, the instant messaging function may be directly linked to the at least one recorded video 202, so that when the recording of the video 202 is completed, the video 114 is automatically posted to the code conversion app 110 using instant messaging function. In an alternate embodiment, the user may review and/or edit the recorded video 202 prior to posting it using the icons 114, 114' to add to the description 204.

In a further embodiment, instant messaging function may comprise a messaging/post feed from at least one social media 112 service, such as, but not limited to, JUSTSYNC®, FACEBOOK®, TWITTER®, MYSPACE, ORKUT, FRIENDSTER, and the like. In yet another embodiment, instant messaging function may comprise of a social media 112 service aggregator, wherein messages, posts, and updates from multiple social media service providers may be aggregated and displayed.

Hardware and Operating Environment

This section provides an overview of example hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the methods 300-600 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Figure 7:
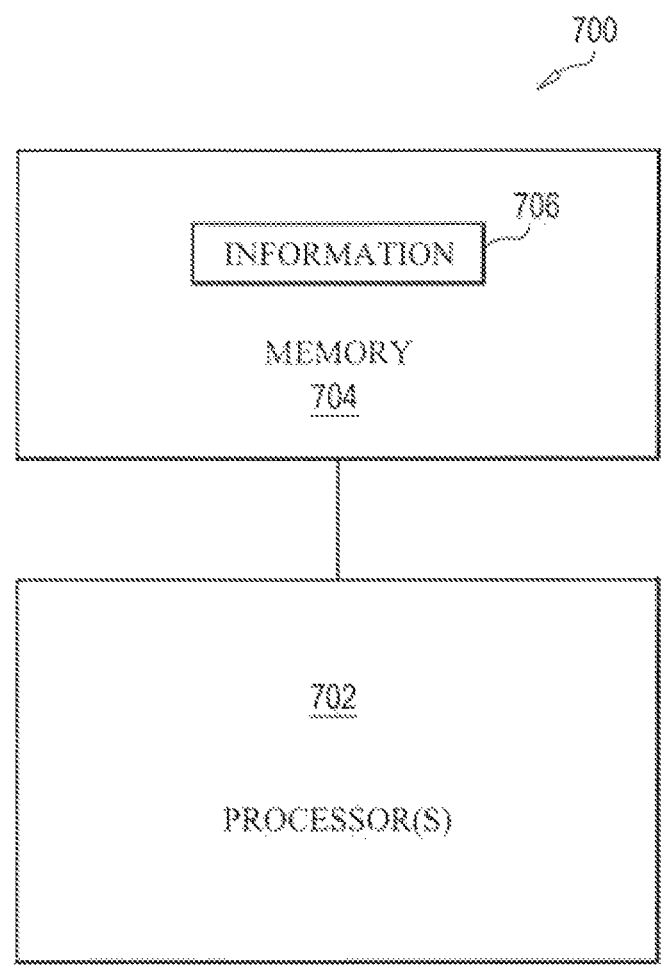
FIG. 7 is a block diagram representing an apparatus according to various embodiments.

FIG. 7 is a block diagram representing an apparatus 700 according to various embodiments. Such embodiments may comprise a computer, a memory system, a magnetic or optical disk, some other storage device, or any type of electronic device or system. The apparatus 700 may include one or more processor(s) 704 coupled to a machine-accessible medium such as a memory 702 (e.g., a memory including electrical, optical, or electromagnetic elements). The medium may contain associated information 704 (e.g., computer program instructions, data, or both) which, when accessed, results in a machine (e.g., the processor(s) 704) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising of:
   a mobile communication device configured for communicating over a communication network;
   a computer processor positioned within the mobile communication device;
   a software application that comprises computer executable instruction code readable by the mobile communication device's computer processor and configured for performing any one or more of the following:
      interfacing with at least one social network to retrieve most recent message posts for user's account from the at least one social network;
      transforming a display of the retrieved most recent message posts to mimic the display on the at least one social network and to include at least one radial button for selecting at least one coded icon wherein the coded icon is representative of at least one previously decoded message and wherein selecting the icon results in selection of the previously decoded message;
      displaying the transformed display, which includes the most recent message posts from the at least one social network and including the at least one radial button for selecting the at least one coded icon corresponding to the at least one previously decoded message;
      receiving a selection of the at least one coded icon;
      converting the selected at least one coded icon into the previously decoded message; and
      posting any one of the at least one coded icon and a link to the decoded message on the at least one social network if a third party viewer is not authorized to view the decoded message.

2. The system of claim 1, wherein the software application's computer executable instruction code is further configured for posting the decoded message on the user's wall within the software application.

3. The system of claim 1, wherein the software application's computer executable instruction code is further configured for generating the link for the decoded message.

4. The system of claim 1, wherein the software application's computer executable instruction code is further configured for transmitting the link to the at least one social network.

5. The system of claim 1, wherein the software application's computer executable instruction code is further configured for posting the at least one icon in real-time on the user's wall within the software application.

6. The system of claim 1, wherein the software application's computer executable instruction code is further configured for requiring activation of the link in order to view the decoded message.

7. The system of claim 1, wherein the software application's computer executable instruction code is further configured for redirecting the link as activated to the software application for display of the decoded message or one or more icons.

8. The system of claim 1, wherein the software application's computer executable instruction code is further configured for fetching periodically the most recent message posts for user's account from the at least one social network and refreshing the transformed display.

9. The system of claim 8, wherein the software application's computer executable instruction code is further configured for displaying the refreshed transformed display, which includes the most recent message posts from the at least one social network as refreshed and including the at least one radial button for selecting the at least one coded icon corresponding to the at least one decoded message.

10. The system of claim 1, further comprising a virtual touch-screen keyboard that comprises a plurality of coded icons that correspond to decoded messages.

11. The system of claim 10, wherein the virtual touch-screen keyboard is configured to receive the selection of at least one coded icon from the plurality of coded icons corresponding to the previously decoded messages.

12. A method comprising of:
using a mobile communication device configured for communicating over a communication network;
using a computer processor positioned within the mobile communication device;
using a software application that comprises computer executable instruction code readable by the mobile communication device's computer processor and configured for performing any one or more of the following:
interfacing with at least one social network to retrieve most recent message posts for user's account from the at least one social network;
transforming a display of the retrieved most recent message posts to mimic the display on the at least one social network and to include at least one radial button for selecting at least one coded icon wherein the coded icon is representative of at least one previously decoded message and wherein selecting the icon results in selection of the previously decoded message;
displaying the transformed display, which includes the most recent message posts from the at least one social network and including the at least one radial button for selecting the at least one coded icon corresponding to the at least one previously decoded message;
receiving a selection of the at least one coded icon;
converting the selected at least one coded icon into the decoded message; and
posting any one of the at least one coded icon and a link to the decoded message on the at least one social network if a third party viewer is not authorized to view the decoded message.

13. The method of claim 12, further comprising posting the decoded message on the user's wall within the software application.

14. The method of claim 12, further comprising generating a link for the decoded message.

15. The method of claim 12, further comprising transmitting the link to the at least one social network.

16. The method of claim 12, further comprising posting the at least one icon in real-time on the user's wall within the software application.

17. The method of claim 12, further comprising requiring activation of the link in order to view the decoded message.

18. The method of claim 12, further comprising redirecting the link as activated to the software application for display of the decoded message or one or more icons.

19. The method of claim 12, further comprising fetching periodically the most recent message posts for user's account from the at least one social network and refreshing the transformed display.

20. The method of claim 19, further comprising displaying the refreshed transformed display, which includes the most recent message posts from the at least one social network as refreshed and including the at least one radial button for selecting the at least one coded icon corresponding to the at least one decoded message.

21. The method of claim 12, further comprising inputting the at least one icon from a virtual touch-screen keyboard that comprises a plurality of coded icons that correspond to decoded messages.

22. The method of claim 21, further comprising wherein the virtual touch-screen keyboard is configured to receive the selection of at least one icon from the plurality of coded icons corresponding to the decoded messages.

* * * * *